United States Patent [19]

Khalifa et al.

[11] Patent Number: 5,181,435
[45] Date of Patent: Jan. 26, 1993

[54] STEERING COLUMN GUIDE ASSEMBLY

[76] Inventors: Mustafa A. Khalifa, 10800 S. Morrow Cir., Dearborn, Mich. 48126; James Chapp, Jr., 5161 Woodrun Ct., West Bloomfield, Mich. 48323

[21] Appl. No.: 859,784

[22] Filed: Mar. 30, 1992

[51] Int. Cl.$^5$ .............................................. B62D 1/18
[52] U.S. Cl. .................................. 74/492; 248/900; 280/777; 280/779
[58] Field of Search .................. 74/492; 280/777, 779; 248/900, 298

[56] References Cited

U.S. PATENT DOCUMENTS

| | | | |
|---|---|---|---|
| 1,050,395 | 1/1913 | Schleicher | 248/298 |
| 3,703,106 | 11/1972 | Arntson et al. | 74/492 |
| 4,022,495 | 5/1977 | Pizzocri | 74/492 X |
| 4,086,825 | 5/1978 | Badcock et al. | 74/492 |
| 4,616,522 | 10/1986 | White et al. | 74/492 |
| 4,738,469 | 4/1988 | Ushijima et al. | 74/492 X |
| 5,024,118 | 6/1991 | Khalifa et al. | 74/492 |
| 5,026,092 | 6/1991 | Abramczyk | 280/777 |
| 5,052,240 | 10/1991 | Miyoshi et al. | 280/777 X |

FOREIGN PATENT DOCUMENTS 1435482  5/1976  United Kingdom ................ 74/492

Primary Examiner—Rodney H. Bonck
Attorney, Agent, or Firm—Edward A. Craig

[57] ABSTRACT

A steering column guide assembly for a collapsible vehicle steering column includes an upper support bracket fixed relative to one portion of vehicle support structure and a lower support bracket secured to another portion of vehicle support structure. The steering column guide assembly also includes a structure for attaching the steering column to the lower support bracket and a structure for guiding the lower support bracket in a substantially horizontal manner relative to the upper support bracket during a collision type impact which causes the portions of the vehicle support structure to move relative to each other.

1 Claim, 4 Drawing Sheets

STEERING COLUMN GUIDE ASSEMBLY

BACKGROUND OF THE INVENTION

1. Field of the Invention

The present invention relates generally to energy absorbing steering columns, and more particularly to a guide assembly for a collapsible energy absorbing steering column.

2. Description of the Related Art

It has been known to provide various energy absorbing and collapsible steering columns in automotive vehicles to reduce injury to a driver during collision. It has also been known to provide a guide structure for energy absorbing and collapsible steering columns. An example of such a guide structure is disclosed in U.S. Pat. No. 5,024,118 to Khalifa et al., the disclosure of which is hereby incorporated by reference.

Accordingly, there has been a need in the art to provide a guide assembly for a steering column which inhibits upward and forward movement of the steering column during a collision type impact until an air bag has been fired relative to a driver of the automotive vehicle, there has also been a need in the art to provide a guide assembly for a steering column which directs movement of the steering column to maintain its original attitude during a collision type impact to fire the air bag on the driver's chest.

SUMMARY OF THE INVENTION

It is, therefore, one object of the present invention to provide a guide assembly for a steering column.

It is another object of the present invention to provide a guide assembly for a steering column which inhibits upward and forward movement of the steering column during a collision type impact.

It is yet another object of the present invention to provide a guide assembly for a steering column which directs movement of the steering column to maintain its original attitude during a collision type impact.

It is a further object of the present invention to provide a new and improved guide assembly for a collapsible energy absorbing steering column.

To achieve the foregoing objects, the present invention is a steering column guide assembly for a collapsible vehicle steering column including an upper support bracket fixed relative to one portion of vehicle support structure and a lower support bracket secured to another portion of vehicle support structure. The steering column guide assembly also includes means for attaching the steering column to the lower support bracket and means for guiding the lower support bracket in a substantially horizontal manner relative to the upper support bracket during a collision type impact which causes the portions of the vehicle support structure to move relative to each other.

One advantage of the present invention is that a guide assembly is provided for a steering column. Another advantage of the present invention is that the guide assembly inhibits upward and forward movement of the steering column and directs the movement of the steering column along its longitudinal axis during a collision type impact. Yet another advantage of the present invention is that the guide assembly directs the movement of the steering column in a generally horizontal translation to maintain its original attitude during a collision type impact to fire the air bag on the driver's chest.

Other objects, features and advantages of the present invention will be readily appreciated as the same becomes better understood after reading the following description taken in conjunction with the accompanying drawings

DESCRIPTION OF THE PREFERRED EMBODIMENT(S)

Figure 1:
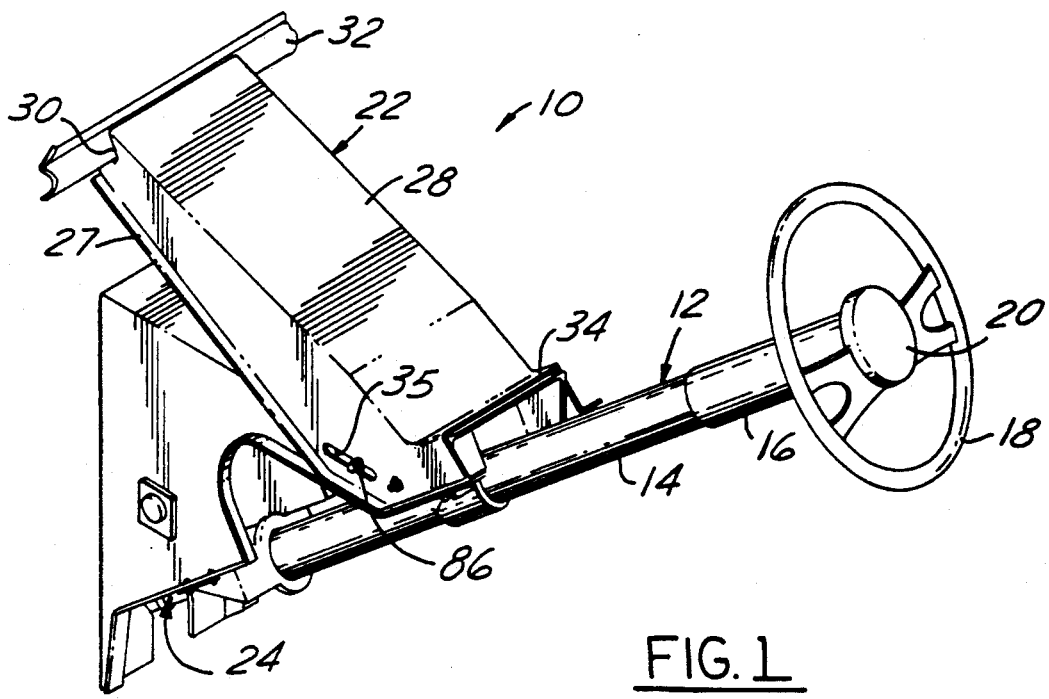
FIG. 1 is an assembled perspective view of the steering column guide assembly according to the present invention shown in operational relationship with a steering column.
Figure 2:
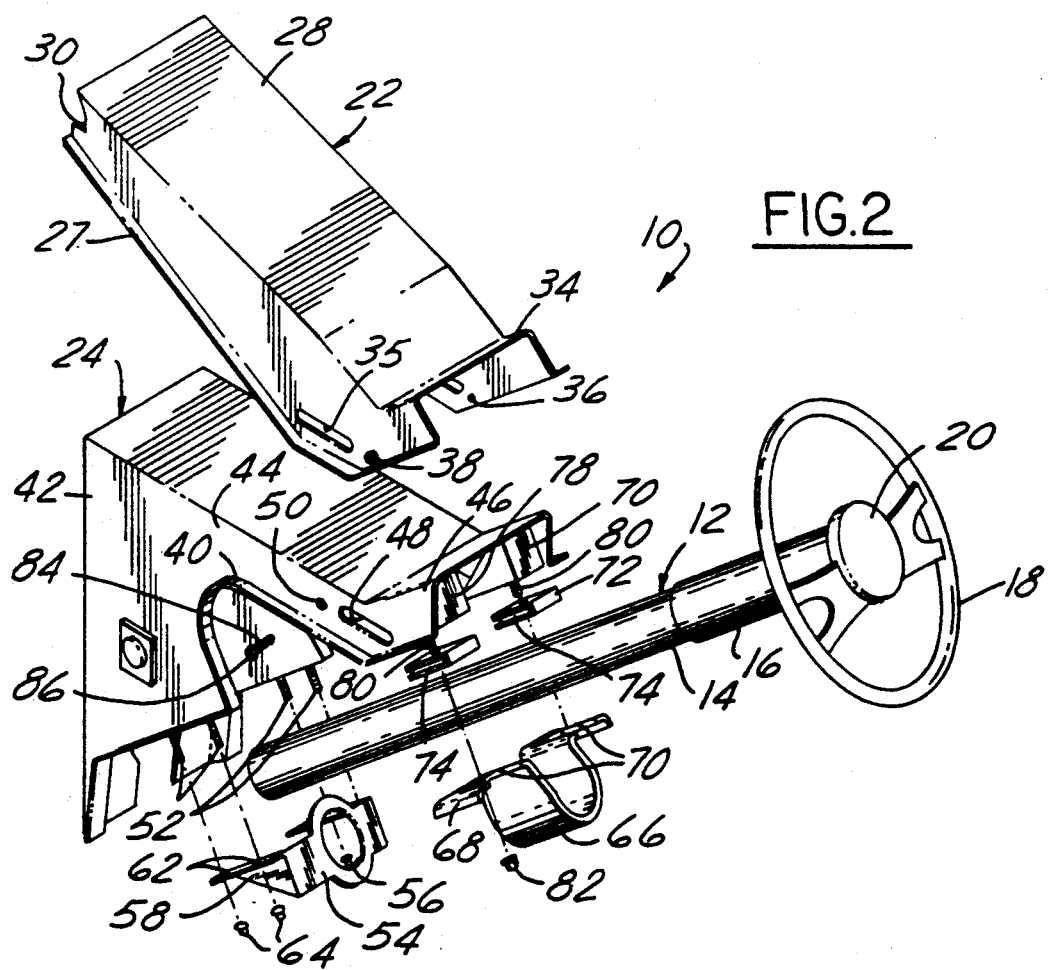
FIG. 2 is a view similar to FIG. 1 and illustrating the steering column guide assembly in exploded form.

Referring now to the drawings, especially to FIGS. 1 and 2, a steering column guide assembly is generally shown at 10 in operational relationship with a steering column, generally indicated at 12, for an automotive vehicle (not shown). The steering column 12 includes a rigid sleeve 14 and a steering shaft 15 (FIG. 5) which is connected to a steering wheel assembly 16 at its upper end and to a shaft coupler (not shown) at its lower end. It should be appreciated that the shaft coupler is operably connected to a steering gear assembly (not shown) for steering of the wheels of the automotive vehicle. The steering wheel assembly 16 includes a steering wheel 18 and an air bag cover 20 for an air bag (not shown) disposed therein. It should be appreciated that the steering wheel assembly 16 may include a gear shift, turn signal switch and hazard warning light switch (not shown).

Figure 5:
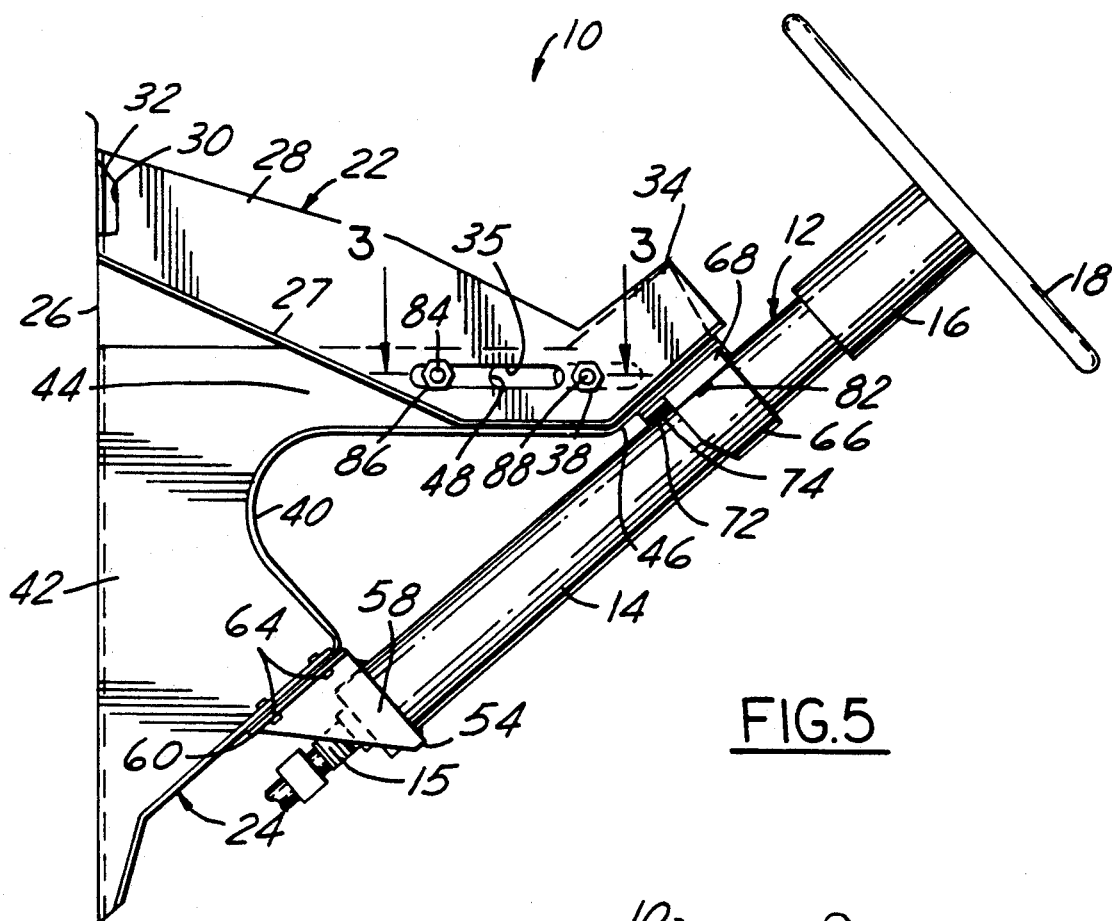
FIG. 5 is a side elevational view of the steering column guide assembly and steering column of FIG. 1 before a collision.
Figure 6:
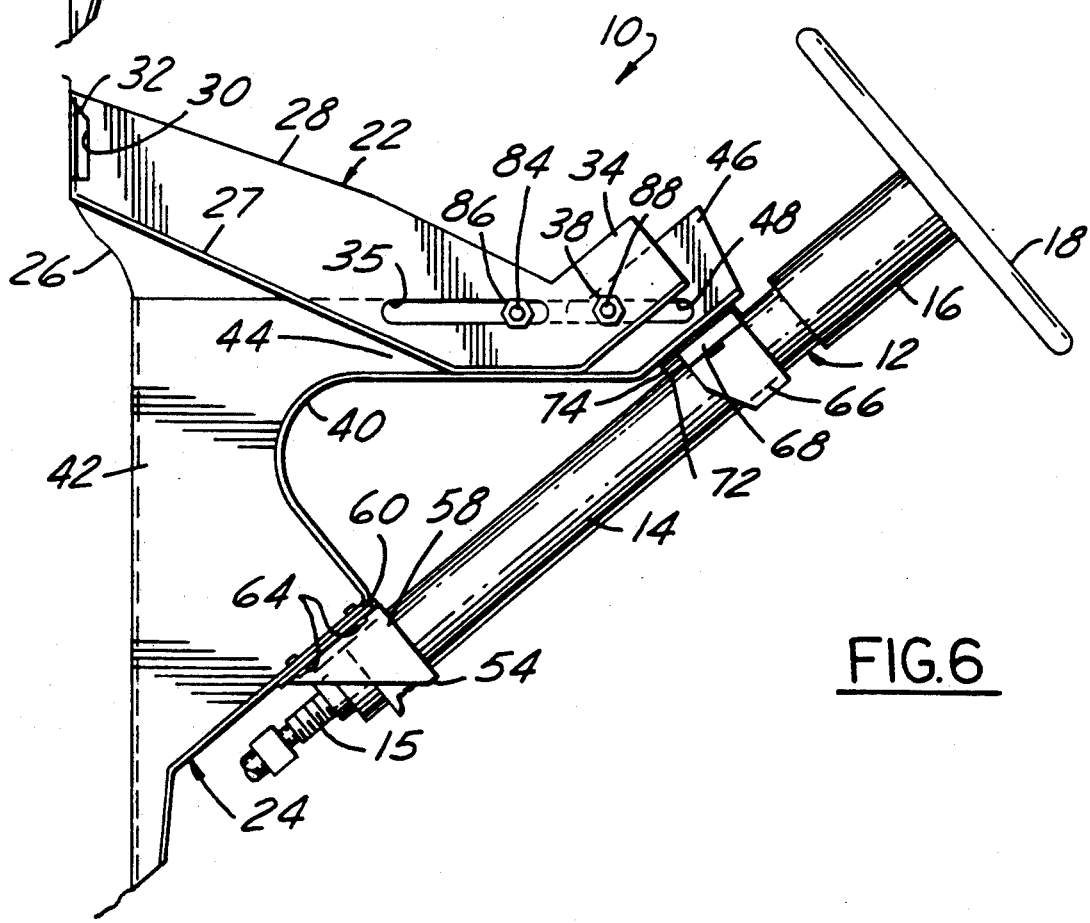
FIG. 6 is a view similar to FIG. 5 after a collision.

The steering column guide assembly 10 includes an upper support bracket, generally indicated at 22, and a brake pedal or lower support bracket, generally indicated at 24, for attaching the steering column 12 to vehicle support structure such as a dash panel 26 (FIG. 5). The upper support bracket 22 has a generally inverted U-shaped cross-section and a flange 27 extending outwardly and generally perpendicular to the U-shape. The upper support bracket 22 has a first or long inclined portion 28 with a notch 30 at one end. The notch 30 is adapted to engage or receive a cowl bar 32 of the dash panel 26. It should be appreciated that the cowl bar 32 is connected to an "A" pillar (not shown) of the vehicle.

The upper support bracket 22 also has a second inclined portion 34 at the other end of the first inclined portion 28 to form a general V-shape. The upper support bracket 22 includes an elongated slot 35 orientated generally horizontally to the inclined portions 28 and 34. The upper support bracket 22 also includes an aperture 36 spaced from one end of the slot 34 and a nut 38 secured adjacent thereto by suitable means such as welding.

The lower support bracket 24 has a generally inverted U-shaped cross-section with a flange 40 extending outwardly and generally perpendicular to the U- shape. The lower support bracket 24 has a generally vertical portion 42, horizontal portion 44 and an inclined portion 46 at one end of the horizontal portion 44. The lower support bracket 24 includes an elongated slot 48 orientated generally horizontally relative to the inclined portion 46. The lower support bracket 24 also includes an aperture 50 spaced from one end of the slot 48. The lower support bracket 24 further includes a pair of threaded members 52 extending outwardly on an angle from the flange 40 on each side of the vertical portion 42 for a function to be described. It should be appreciated that the lower support bracket 24 is secured to the dash panel 26 by suitable means such as fasteners (not shown).

The lower support bracket 24 includes a guide bracket 54 for attaching a lower end of the steering column 12 to the lower support bracket 24. The guide bracket 54 is of a conventionally known type which absorbs energy during a collision by collapse and deformation thereof, such as by twisting type deformation upon non-axial forces being imposed on the guide bracket 54 by the steering column 12.

Figure 7:
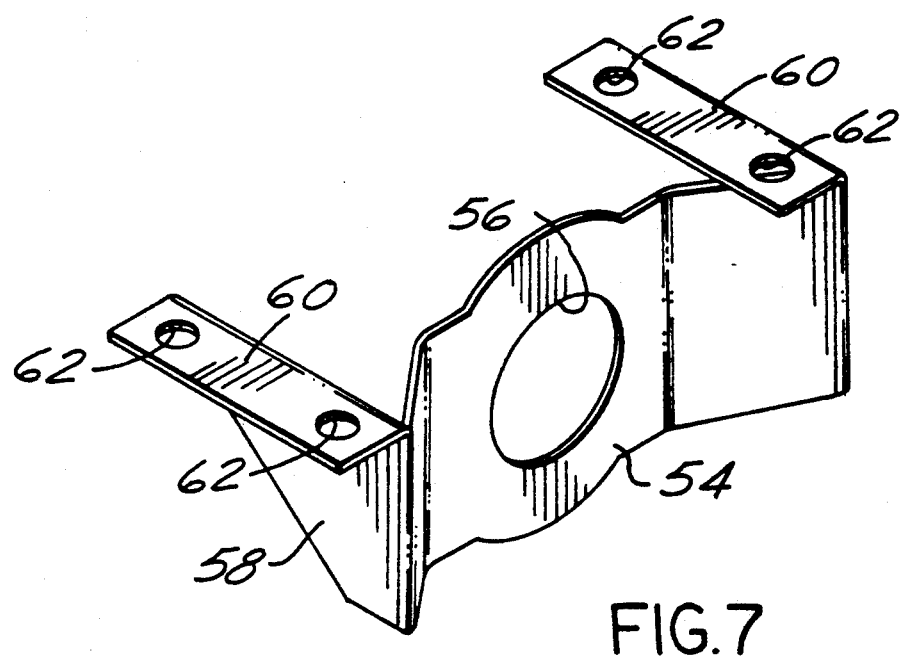
FIG. 7 is a perspective view of a bent bracket of FIG. 6.

Referring to FIGS. 2 and 7, the guide bracket 54 is shown in more detail. The guide bracket 54 has an aperture 56 adapted to receive the rigid sleeve 14 of the steering column 12. The guide bracket 54 is secured to the rigid sleeve 12 by suitable means such as welding. The guide bracket 54 includes side flanges 58 extending outwardly perpendicularly and end flanges 60 extending outwardly perpendicularly from the side flanges 58. The end flanges 60 have a pair of spaced apertures 62 adapted to receive the threaded members 52. The guide bracket 54 is removeably secured to the lower support bracket 22 by suitable means such as nuts 64. It should be appreciated that the guide bracket 54 illustrated in FIG. 7 has been bent or deformed along the axis of the aperture 56 after a collision type impact.

The lower support bracket 24 includes a sleeve bracket 66 having a generally U-shaped configuration for attaching an upper end of the steering column 12 to the lower support bracket 24. The sleeve bracket 66 has flanges 68 extending outwardly perpendicularly at the ends of the U-shape. The flanges 68 have a generally rectangular and open ended slots 70. The slots 70 are open in a direction generally facing the steering wheel assembly 16 to allow axially downward movement of the steering column 12 during a collision type impact The lower support bracket 24 includes a pair of spacers 72 adapted to be received by the slots 70 to insulate the steering column 12 from vibrations during operation of the automotive vehicle and for allowing axial movement of the steering column 12 upon a collision type impact. The spacers 72 are made of a plastic material, preferably a nylon material. The spacers 72 include longitudinally extending grooves 74 on either side thereof which slideably engage the open ended slots 72 provided on the flanges 68 of the sleeve bracket 66. The spacers 72 also include an aperture 76 extending therethrough.

Figure 4:
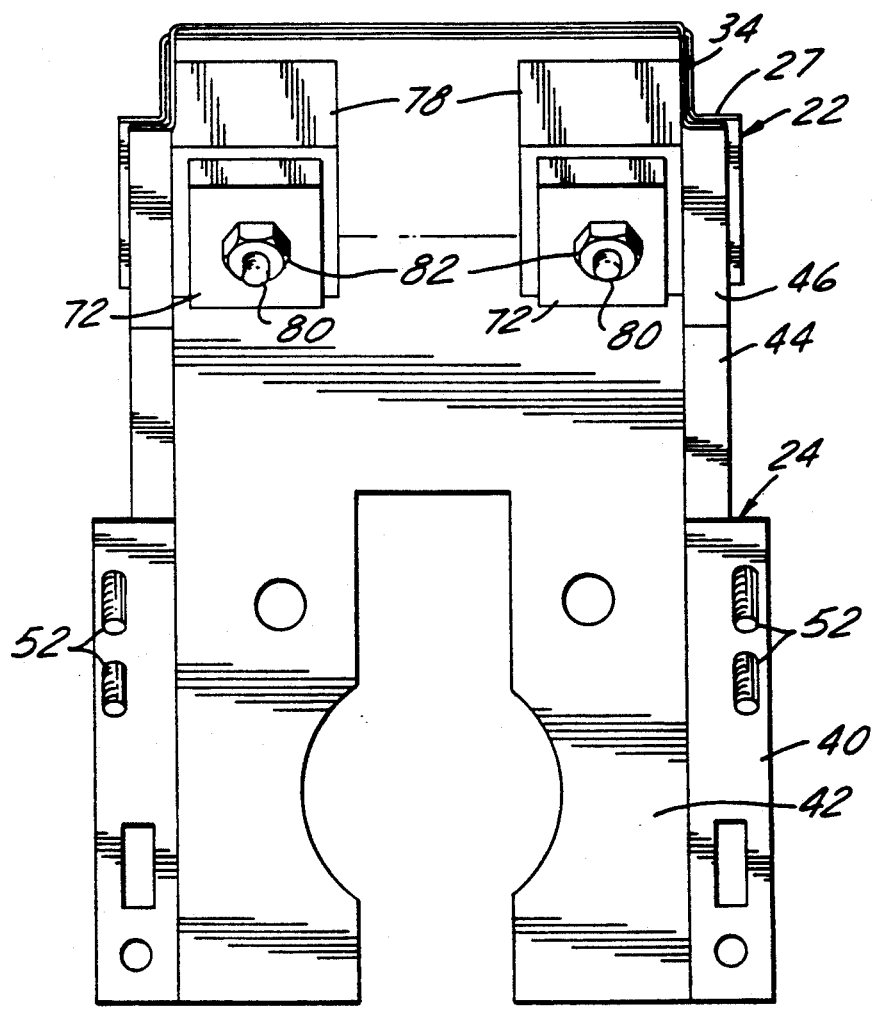
FIG. 4 is a bottom view of a lower support bracket of FIGS. 1 and 2.

Referring to FIGS. 2 and 4, the lower support bracket 24 includes mounting portions 78 extending outwardly from the inclined portion 34. The mounting portions 78 include threaded members 80 extending outwardly at an angle. The spacers 72 are secured to the threaded members 80 by suitable means such as nuts 82.

Figure 3:
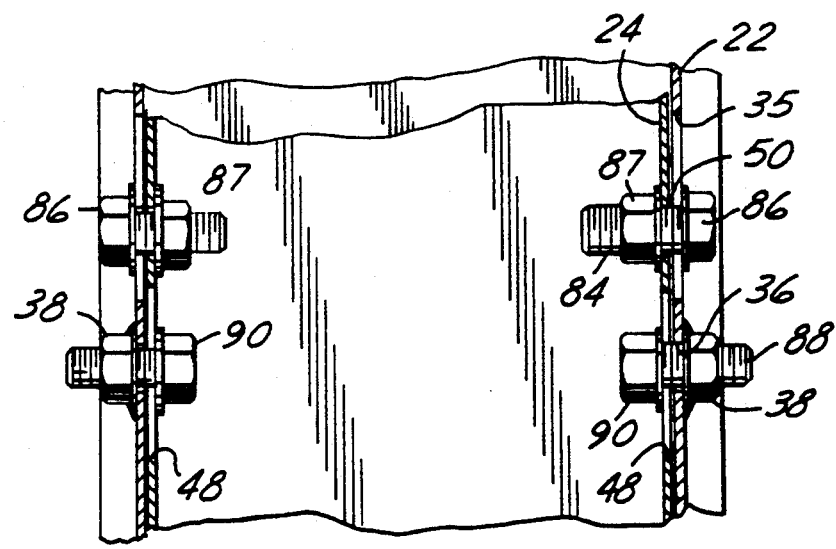
FIG. 3 is a sectional view taken along lines 3—3 of FIG. 5.

Referring to FIGS. 1 through 3, the steering column guide assembly 10 includes a plurality of fasteners 84, 88 to fasten or attach the lower support bracket 24 and upper support bracket 22 to each other. The steering column guide assembly 10 includes a first bolt 84 having a head 86 disposed on the exterior of the upper support bracket 22 and extending through slot 35 and aperture 50. A nut 87 threadably engages the first bolt 84 to prevent the first bolt 84 from exiting the aperture 50. The steering column guide assembly 10 also includes a second bolt 88 having a head 90 disposed on the interior of the lower support bracket 24 and extending through the slot 48 and aperture 36 and threadably engaging the nut 38. It should be appreciated that the bolts 84 and 88 may slide in the slots 35 and 48, respectfully.

In operation, upon a collision type impact, the dash panel 26 moves in a horizontal direction rearwardly relative to the cowl bar 32 which is fixed to the "A" pillar. At the same time this is occurring, the steering column 12 moves along its longitudinal axis. The flanges 70 of the sleeve bracket 66 slide along the grooves 74 and away from the spacers 72. The guide bracket 54 acts as an energy absorber during impact and is bent downwardly as illustrated in FIG. 7. The bolts 84 and 88 move along slots 35 and 48, respectively, to allow the lower support bracket 24 to move or translate linearly relative to the upper support bracket 22 as illustrated in FIG. 5. The bolts 84 and 88 prevent rotation of the brackets 22 and 24 relative to each other. As a result, the steering column 12 maintains its original attitude to allow the air bag to be fired in the driver's chest.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A steering column guide assembly for a collapsible vehicle steering column, comprising:

an upper support bracket fixed relative to one portion of vehicle support structure;

a lower support bracket secured to another portion of vehicle support structure;

a guide bracket attached to said lower support bracket and means forming an aperture to receive the steering column, a sleeve bracket adapted to receive the steering column and having a pair of spaced apart flanges, spacers adapted to engage said flanges, and fastening means for fastening said spacers and guide bracket to said lower bracket to attach the steering column to said lower support bracket;

said lower support bracket having a first slot and a first aperture spaced from one end of said first slot, and said upper support bracket having a second slot in adjacent said first aperture and a second aperture spaced from one end of said second slot adjacent said first slot; and a first bolt having a head disposed on the interior of said lower support bracket and extending through said first slot and said second aperture and having a first nut engaged therewith, and a second bolt having a head disposed on the exterior of said upper support bracket and extending through said second slot and said first aperture and having a second nut engaged therewith for guiding said lower support bracket in a substantially horizontal manner relative to said upper support bracket during a collision type impact which causes the portions of vehicle support structure to move relative to each other.

* * * * *

UNITED STATES PATENT AND TRADEMARK OFFICE
CERTIFICATE OF CORRECTION

PATENT NO. : 5,181,435
DATED : January 26, 1993
INVENTOR(S) : Khalifa, et. al.

It is certified that error appears in the above-indentified patent and that said Letters Patent is hereby corrected as shown below:

Title page, item [73], Assignee: insert -- Chrysler Corporation--.

Signed and Sealed this

Nineteenth Day of July, 1994

Attest:

BRUCE LEHMAN

*Attesting Officer*  *Commissioner of Patents and Trademarks*